US012795417B2

(12) United States Patent
Wu et al.

(10) Patent No.: US 12,795,417 B2
(45) Date of Patent: Nov. 10, 2026

(54) METHODS AND APPARATUSES FOR A RADIO LINK FAILURE (RLF) PROCESSING PROCEDURE AND A POWER HEADROOM REPORT (PHR) PROCEDURE IN A DEACTIVATED SECONDARY NODE (SN) CASE

(71) Applicant: LENOVO (BEIJING) LIMITED, Beijing (CN)

(72) Inventors: Lianhai Wu, Beijing (CN); Mingzeng Dai, Shanghai (CN); Congchi Zhang, Shanghai (CN); Bingchao Liu, Beijing (CN); Jie Shi, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 337 days.

(21) Appl. No.: 18/550,823

(22) PCT Filed: Mar. 16, 2021

(86) PCT No.: PCT/CN2021/081072

§ 371 (c)(1),
(2) Date: Sep. 15, 2023

(87) PCT Pub. No.: WO2022/193128

PCT Pub. Date: Sep. 22, 2022

(65) Prior Publication Data

US 2024/0172017 A1 May 23, 2024

(51) Int. Cl.
*H04W 24/08* (2009.01)
*H04W 24/10* (2009.01)
(Continued)

(52) U.S. Cl.
CPC ........... *H04W 24/08* (2013.01); *H04W 24/10* (2013.01); *H04W 52/365* (2013.01); *H04W 76/19* (2018.02); *H04W 76/20* (2018.02)

(58) Field of Classification Search
CPC ... H04W 24/08; H04W 24/10; H04W 52/365; H04W 76/15; H04W 76/19; H04W 76/20
(Continued)

(56) References Cited

U.S. PATENT DOCUMENTS 12,641,549 B2 * 5/2026 Cheng ................. H04W 52/365
2015/0271726 A1 * 9/2015 Kim ................ H04W 36/00692 370/329
(Continued)

FOREIGN PATENT DOCUMENTS

CN 112399528 A 2/2021
WO 2020051588 A1 3/2020
(Continued)

OTHER PUBLICATIONS

International Search Report and Written Opinion dated Dec. 6, 2021 for International Application No. PCT /CN2021/081072.
(Continued)

*Primary Examiner* — Jean A Gelin
(74) *Attorney, Agent, or Firm* — AMPACC Law Group, PLLC

(57) ABSTRACT

Embodiments of the present application relate to methods and apparatuses for a radio link failure (RLF) processing procedure and a power headroom report (PHR) procedure in a deactivated secondary node (SN) case in a multi-radio dual connectivity (MR-DC) scenario under a 3rd Generation Partnership Project (3GPP) 5G system or the like. According to an embodiment of the present application, a method can include: receiving configuration information from a network, wherein the configuration information relates to a master node (MN) and a SN; receiving a deactivation indication from the network, wherein the deactivation indication is associated with the SN; and in response to receiving the deactivation indication, stopping a timer associated with
(Continued)

a RLF if the timer associated with a RLF is running, and reporting a PHR.

20 Claims, 4 Drawing Sheets

(51) Int. Cl.

*H04W 52/36* (2009.01)
*H04W 76/19* (2018.01)
*H04W 76/20* (2018.01)

(58) Field of Classification Search

USPC .......................................................... 370/329
See application file for complete search history.

(56) References Cited

U.S. PATENT DOCUMENTS

| | | | | |
|---|---|---|---|---|
| 2018/0092118 | A1* | 3/2018 | Kim | H04W 72/12 |
| 2019/0090151 | A1 | 3/2019 | Yiu | |
| 2019/0223116 | A1 | 7/2019 | Chen et al. | |
| 2020/0100311 | A1* | 3/2020 | Cirik | H04B 7/06964 |
| 2020/0260518 | A1 | 8/2020 | Orsino et al. | |
| 2021/0028853 | A1* | 1/2021 | Wu | H04B 7/0626 |
| 2021/0092612 | A1* | 3/2021 | Yang | H04W 12/106 |
| 2021/0153281 | A1 | 5/2021 | Deogun et al. | |
| 2021/0159967 | A1* | 5/2021 | Cirik | H04L 5/001 |
| 2022/0046750 | A1* | 2/2022 | Jeon | H04W 36/06 |
| 2022/0123823 | A1* | 4/2022 | Dong | H04B 7/0695 |
| 2022/0140884 | A1* | 5/2022 | Shi | H04W 24/10 370/329 |
| 2022/0149926 | A1* | 5/2022 | You | H04W 76/19 |
| 2022/0167445 | A1* | 5/2022 | Wang | H04W 76/27 |
| 2023/0028423 | A1* | 1/2023 | Xu | H04B 7/0408 |
| 2023/0048183 | A1* | 2/2023 | Xu | H04W 76/20 |
| 2023/0189084 | A1* | 6/2023 | Wang | H04W 36/0055 370/331 |
| 2023/0262540 | A1* | 8/2023 | Kim | H04W 76/19 370/216 |
| 2024/0172306 | A1* | 5/2024 | Wallentin | H04W 28/0278 |

FOREIGN PATENT DOCUMENTS

| | | | |
|---|---|---|---|
| WO | 2021026906 | A1 | 2/2021 |
| WO | 2021026930 | A1 | 2/2021 |
| WO | 2021037583 | A1 | 3/2021 |

OTHER PUBLICATIONS

European Search Report dated Nov. 29, 2024 for European patent application No. 21930724.6.

* cited by examiner

METHODS AND APPARATUSES FOR A RADIO LINK FAILURE (RLF) PROCESSING PROCEDURE AND A POWER HEADROOM REPORT (PHR) PROCEDURE IN A DEACTIVATED SECONDARY NODE (SN) CASE

CROSS REFERENCE TO RELATED APPLICATIONS

This application is a national phase entry of International Application No. PCT/CN2021/081072 filed Mar. 16, 2021, which is incorporated by reference in its entirety.

TECHNICAL FIELD

Embodiments of the present application generally relate to wireless communication technology, especially to methods and apparatuses for a radio link failure (RLF) processing procedure and a power headroom report (PHR) procedure in a deactivated secondary node (SN) case in a multi-radio dual connectivity (MR-DC) scenario.

BACKGROUND

Next generation radio access network (NG-RAN) supports a MR-DC scenario. In a MR-DC scenario, a user equipment (UE) with multiple transceivers may be configured to utilize resources provided by two different nodes connected via non-ideal backhauls. Wherein one node may provide new radio (NR) access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, a Xn interface as specified in 3rd Generation Partnership Project (3GPP) standard documents), and at least the MN is connected to the core network.

In general, there are three types of states defined for a SN in a MR-DC scenario, i.e., an activated state, a deactivated state, and a dormant state. In some cases, a deactivated state and a dormant state refer to the same state of a SN. Currently, details regarding a RLF processing procedure and a PHR procedure in a deactivated SN case in a MR-DC scenario have not been discussed in 3GPP 5G technology yet.

SUMMARY

Some embodiments of the present application provide a method for wireless communications. The method may be performed by a UE. The method includes: receiving configuration information from a network, wherein the configuration information relates to a MN and a SN; receiving a deactivation indication from the network, wherein the deactivation indication is associated with the SN; and in response to receiving the deactivation indication, setting a SN state of the UE as a deactivated state.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a further method for wireless communications. The further method may be performed by a UE. The method includes: receiving a deactivation indication from a network, wherein the deactivation indication is associated with a SN; and determining whether a timer for fast master cell group (MCG) link recovery is running.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method performed by a UE.

Some embodiments of the present application provide a method for wireless communications. The method may be performed by a base station (BS). The method includes: transmitting, to a UE, configuration information relating to a MN and a SN; and transmitting, to the UE, a deactivation indication associated with the SN, wherein the deactivation indication is used for setting a SN state of the UE as a deactivated state.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a BS.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
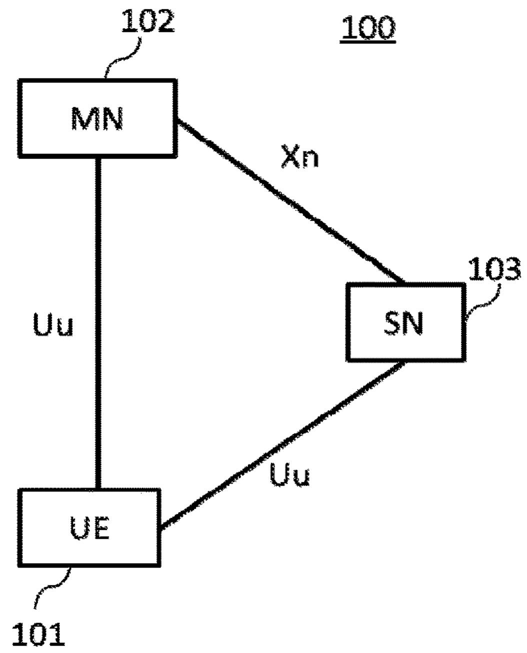
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB.

MN 102 may be associated with a master cell group (MCG). The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a secondary cell group (SCG). The SCG may refer to a group of serving cells associated with SN 103, and may include a primary secondary cell (PSCell) and optionally one or more SCells. The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like.

In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network.

In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

The following table shows introductions of some timers as specified in 3GPP standard documents, including a starting condition, a stop condition, and an operation at expiry. A possible general name for timer T310 may be "a timer associated with a physical layer problem" or the like. A possible general name for timer T311 may be "a timer for RRC connection re-establishment" or the like. A possible general name for timer T312 may be "a timer for initiating failure recovery based on triggering a measurement report" or the like. A possible general name for timer T316 may be "a timer for fast MCG link recovery" or the like.

| Timer | Start | Stop | At expiry |
|---|---|---|---|
| T310 | Upon detecting physical layer problems for the SpCell i.e., upon receiving N310 | Upon receiving N311 consecutive in-sync indications from lower layers for the SpCell, upon receiving | If the T310 is kept in MCG: If AS security is not activated: go to RRC_IDLE else: initiate the MCG failure |

-continued

| Timer | Start | Stop | At expiry |
|---|---|---|---|
| | consecutive out-of-sync indications from lower layers. | RRCReconfiguration with reconfiguration WithSync for that cell group, and upon initiating the connection re-establishment procedure. Upon SCG release, if the T310 is kept in SCG. | information procedure as specified in 5.7.3b or the connection re-establishment procedure as specified in 5.3.7. If the T310 is kept in SCG, Inform E-UTRAN/NR about the SCG radio link failure by initiating the SCG failure information procedure as specified in 5.7.3. |
| T311 | Upon initiating the RRC connection re-establishment procedure | Upon selection of a suitable NR cell or a cell using another RAT. | Enter RRC_IDLE |
| T312 | If T312 is configured in MCG: Upon triggering a measurement report for a measurement identity for which T312 has been configured, while T310 in PCell is running. If T312 is configured in SCG: Upon triggering a measurement report for a measurement identity for which T312 has been configured, while T310 in PSCell is running. | Upon receiving N311 consecutive in-sync indications from lower layers for the SpCell, receiving RRCReconfiguration with reconfiguration WithSync for that cell group, upon initiating the connection re-establishment procedure, and upon the expiry of T310 in corresponding SpCell. Upon SCG release, if the T312 is kept in SCG | If the T312 is kept in MCG: If security is not activated: go to RRC_IDLE else: initiate the connection re-establishment procedure. If the T312 is kept in SCG, Inform E-UTRAN/NR about the SCG radio link failure by initiating the SCG failure information procedure.as specified in 5.7.3. |
| T316 | Upon transmission of the MCGFailureInformation message | Upon resumption of MCG transmission, upon reception of RRCRelease, or upon initiating the re-establishment procedure | Perform the actions as specified in 5.7.3b.5. |

Figure 2:
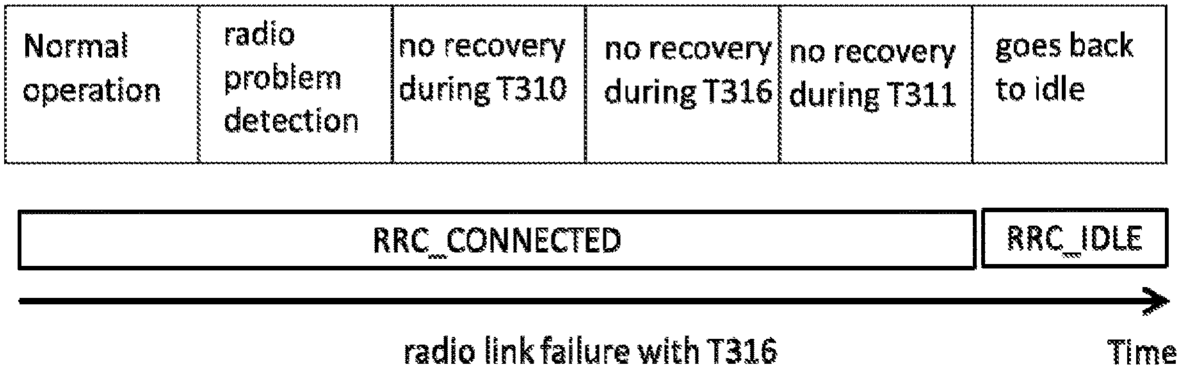
FIG. 2 illustrates an exemplary timeline of a RLF with a fast MCG link recovery procedure in accordance with some embodiments of the present application.

FIG. 2 illustrates an exemplary timeline of a RLF with a fast MCG link recovery procedure in accordance with some embodiments of the present application. The embodiments of FIG. 2 may be performed by a UE (e.g., UE 101 as shown and illustrated in FIG. 1).

As shown in FIG. 2, a UE firstly performs a data transmission at a stage of a normal operation. The UE detects a radio link problem if, for example, a MAC layer of the UE receives the N310 consecutive out-of-sync indication from a physical layer of the UE, which means a radio link problem occurs. The UE then starts a timer, e.g., timer T310 as specified in 3GPP standard documents. During the period of timer T310, if the MAC layer of the UE receives the N311 consecutive in-sync indication from the physical layer, which means that the UE is successfully connected to a network, the UE may stop timer T310.

When timer T310 expires, which means no recovery during timer T310, the UE initiates a fast MCG link recovery procedure. Specifically, as specified in 3GPP standard documents, the UE transmits MCG failure information to a MN (e.g., MN 102 as shown and illustrated in FIG. 1) via a SN (e.g., SN 103 as shown and illustrated in FIG. 1) and starts timer T316 as shown in FIG. 2. If the UE receives a radio resource control (RRC) reconfiguration message from the MN via the SN, the UE stops timer T316, which means that the fast MCG link recovery procedure is terminated. Otherwise, in response to timer T316 expiry, which means no recovery during timer T316, the UE performs a RRC re-establishment procedure and starts timer T311 as specified in 3GPP standard documents for a cell selection.

If timer T311 expires, which means no recovery during timer T311, the UE goes back to an idle state, e.g., a RRC_IDLE state. Before timer T311 expires, the UE is in RRC_CONNECTED state as shown in FIG. 2. After timer T311 expires, the UE enters into in the RRC_IDLE state as shown in FIG. 2.

The above descriptions regarding the embodiments of FIG. 2 do not consider timer T312. Some embodiments assume that timer T312 as specified in 3GPP standard documents is configured. In these embodiments, the UE will start timer T312, if timer T310 is running and a measurement report for a measurement identity for which timer T312 has been configured is triggered. After timer T312 expires, the UE may declare a failure and trigger a failure recovery procedure, e.g., a fast MCG link recovery procedure which has been configured.

As specified in 3GPP Release 17 work item on NR support of a SN activation or deactivation procedure in a MR-DC scenario, a SN activation or deactivation procedure can be triggered by a MN, a SN, or a UE. There are following Options 1-3 to activate and/or deactivate a SN.

(1) Option 1: a SN may be activated or deactivated upon SCell configuration. In Option 1, on one hand, a MN may configure a UE to set a SN's state in SN relevant configuration information in the UE as an activated or deactivated state, and then, the MN informs the SN. On the other hand, a SN may configure a UE. In particular, if SRB3 is configured, the SN transmits (de)activation indication to the UE directly; and if SRB3 is not configured and if the SN transmits an (de)activation indication to the UE for setting a SN's state in SN relevant configuration information in the UE as an activated state, the SN needs to transmit RRC Reconfiguration contained in a message DLInformationTransferMRDC message via the MN.

(2) Option 2: a SN may be activated or deactivated via a SN activation MAC CE or a SN deactivation MAC CE. A SN activation MAC CE is only transmitted by a MN. A SN deactivation MAC CE can be transmitted by a MN and a SN.

(3) Option 3: a SN may be deactivated upon an expiry of a timer for a deactivated or dormant SN.

As specified in 3GPP standard document TS37.340, a power headroom report (PHR) is needed to provide a support for power-aware packet scheduling. In NR, three types of reporting are supported: a first one for physical uplink share channel (PUSCH) transmission, a second one for PUSCH and physical uplink control channel (PUCCH) transmission in an LTE cell group in EN-DC and a third one for sounding reference signal (SRS) transmission on SCells configured with SRS only.

(1) Type 1 power headroom: the difference between the nominal UE maximum transmit power and the estimated power for UL-SCH transmission per activated serving cell;

(2) Type 2 power headroom: the difference between the nominal UE maximum transmit power and the estimated power for UL-SCH and PUCCH transmission on SpCell of the other MAC entity (i.e., E-UTRA MAC entity in EN-DC, NE-DC, and NGEN-DC cases);

(3) Type 3 power headroom: the difference between the nominal UE maximum transmit power and the estimated power for SRS transmission per activated Serving Cell.

In a case of a carrier aggregation (CA), when no transmission takes place on an activated SCell, a reference power is used to provide a virtual report. Power headroom reports are transmitted using MAC signalling.

As specified in 3GPP standard document, with configured grants, a BS can allocate uplink resources for the initial hybrid automatic repeat request (HARQ) transmissions and HARQ retransmissions to UE(s). Two types of configured uplink grants are defined:

(1) With configured uplink grants Type 1, RRC signalling directly provides the configured uplink grant (including the periodicity).

(2) With configured uplink grants Type 2, RRC signalling defines the periodicity of the configured uplink grant while physical downlink control channel (PDCCH) addressed to a configured scheduling radio network temporary identifier (CS-RNTI) can either signal and activate the configured uplink grant, or deactivate it; i.e., a PDCCH addressed to CS-RNTI indicates that the uplink grant can be implicitly reused according to the periodicity defined by RRC signalling, until deactivated.

In addition, a BS can allocate downlink resources for the initial HARQ transmissions to UE(s): RRC signalling defines the periodicity of the configured downlink assignments while PDCCH addressed to CS-RNTI can either signal and activate the configured downlink assignment, or deactivate it. That is, a PDCCH addressed to CS-RNTI indicates that the downlink assignment can be implicitly reused according to the periodicity defined by RRC signalling, until deactivated.

A UE may be configured with up to 8 active configured downlink assignments for a given BWP of a serving cell. When more than one active configured downlink assignments are configured to the UE:

(1) the network decides which of these configured downlink assignments are active at a time (including all of them); and (2) each configured downlink assignment is activated separately using a downlink control information (DCI) command and deactivation of configured downlink assignments is done using a DCI command, which can either deactivate a single configured downlink assignment or multiple configured downlink assignments jointly.

Currently, more details regarding a RLF processing procedure and a PHR procedure in a deactivated SN case in a MR-DC scenario are unclear. Some embodiments of the present application provide mechanisms for a UE's behaviour, e.g., handling the legacy timer T310 or T312 upon a SN state in the UE side entering a deactivated state. Some further embodiments of the present application provide mechanisms for handling timer T312 at a deactivated SN state in a UE side. Some additional embodiments of the present application provide mechanisms for a UE's behaviour considering both a deactivated SN state in the UE side and a fast MCG link recovery. Some additional embodiments of the present application handle an enhanced PHR mechanism at a deactivated SN state in a UE side, for example, introducing new trigger condition(s) upon setting a deactivated SN state or an activated state in the UE side. Some further embodiments of the present application provide mechanisms for reallocating UE power to a MN when a SN state in a UE side is deactivated.

More details regarding embodiments of the present application will be illustrated in the following text in combination with the appended drawings. Following definitions are assumed in the embodiments of the present application:

1) Fast MCG link recovery: in a MR-DC scenario, a RRC procedure where a UE sends an MCG Failure Information message to a MN via a SCG upon the detection of a radio link failure on the MCG.

2) Master Cell Group (MCG): in a MR-DC scenario, a group of serving cells associated with a MN, comprising of the SpCell (PCell) and optionally one or more SCells.

3) Secondary Cell Group (SCG): in a MR-DC scenario, a group of serving cells associated with a SN, comprising of the SpCell (PSCell) and optionally one or more SCells.

4) Secondary node (SN): in a MR-DC scenario, the radio access node, with no control plane connection to the core network, providing additional resources to a UE. It may be an en-gNB (in EN-DC), a Secondary ng-eNB (in NE-DC) or a Secondary gNB (in NR-DC and NGEN-DC).

5) SCG bearer: in a MR-DC scenario, a radio bearer with an RLC bearer (or two RLC bearers, in case of CA packet duplication in an E-UTRAN cell group, or up to four RLC bearers in case of CA packet duplication in a NR cell group) only in the SCG.

6) SpCell: a primary cell of a master or secondary cell group.

7) signaling radio bearer (SRB) 3: in EN-DC, NGEN-DC and NR-DC, a direct SRB between the SN and the UE.
8) Split bearer: in a MR-DC scenario, a radio bearer with RLC bearers both in MCG and SCG.

Figure 3A:
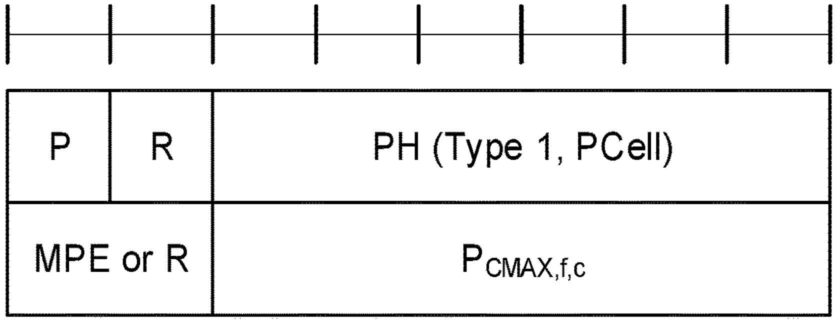
FIGS. 3A and 3B illustrate two exemplary format diagrams of a PHR MAC CE in accordance with 3GPP standard document TS38.321.
Figure 3B:
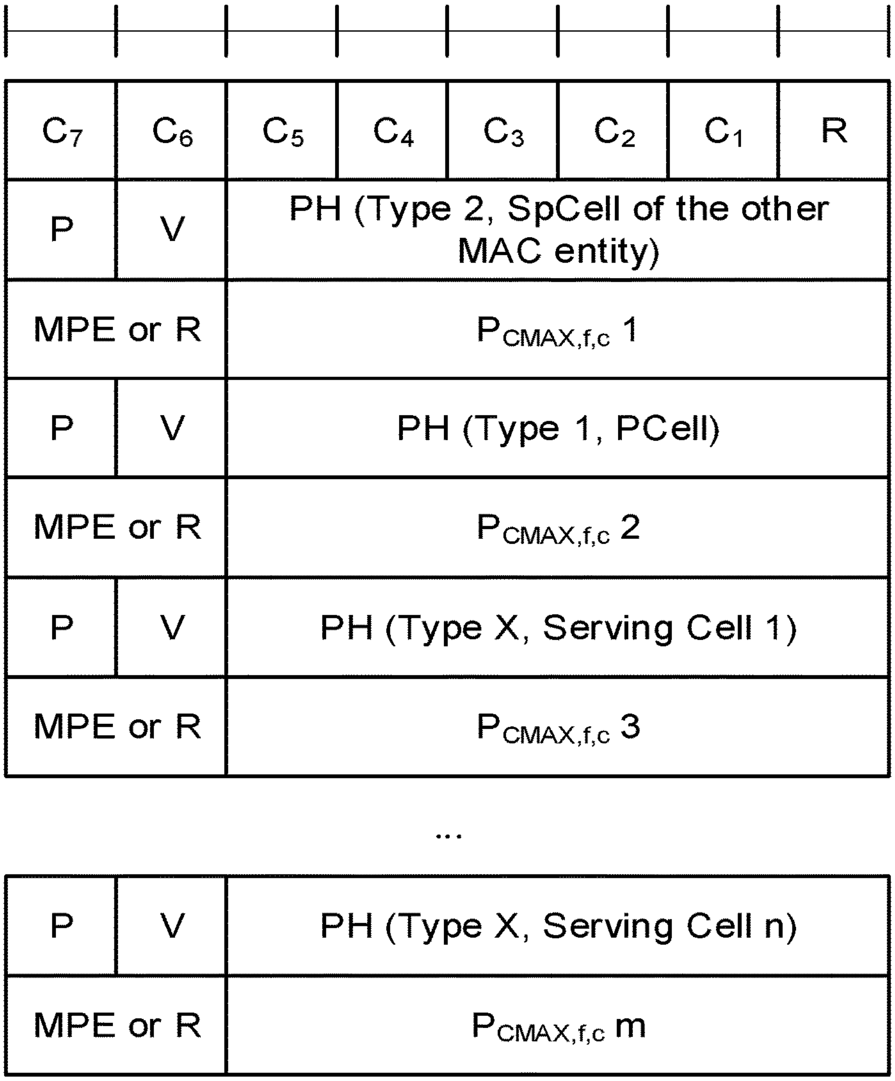

FIGS. 3A and 3B illustrate two exemplary format diagrams of a PHR MAC CE in accordance with 3GPP standard document TS38.321. In the embodiments of FIG. 3A, fields in a single entry PHR MAC CE as defined in TS38.321 are as follows:

1) P: if mpe-Reporting-FR2 is configured and the serving cell operates on FR2, the MAC entity shall set this field to 0 if the applied P-MPR value, to meet MPE requirements, as specified in TS38.101-2 [15], is less than P-MPR_00 as specified in TS38.133 and to 1 otherwise. If mpe-Reporting-FR2 is not configured or the serving cell operates on FR1, this field indicates whether power backoff is applied due to power management (as allowed by $P\text{-}MPR_c$ as specified in TS38.101-1 [14], TS38.101-2 [15], and TS38.101-3 [16]). The MAC entity shall set the P field to 1 if the corresponding $P_{CMAX,f,c}$ field would have had a different value if no power backoff due to power management had been applied.
2) R: this field is a reserved bit, and it is set to 0.
3) Power Headroom (PH): this field indicates the power headroom level. The length of the field is 6 bits. The reported PH and the corresponding power headroom levels are shown in Table 6.1.3.8-1 specified in TS38.321.
4) MPE: if mpe-Reporting-FR2 is configured, and the serving cell operates on FR2, and if the P field is set to 1, this field indicates the applied power backoff to meet MPE requirements, as specified in TS38.101-2 [15]. This field indicates an index to Table 6.1.3.8-3 and the corresponding measured values of P-MPR levels in dB are specified in TS38.133 [11]. The length of the field is 2 bits. If mpe-Reporting-FR2 is not configured, or if the Serving Cell operates on FR1, or if the P field is set to 0, R bits are present instead.
5) $P_{CMAX,f,c}$: this field indicates the $P_{CMAX,f,c}$ (as specified in TS38.213 [6]) used for calculation of the preceding PH field. The reported $P_{CMAX,f,c}$ and the corresponding nominal UE transmit power levels are shown in Table 6.1.3.8-2 in TS38.321 (the corresponding measured values in dBm are specified in TS38.133 [11]).

In the embodiments of FIG. 3B, fields in a multiple entry PHR MAC CE as defined in TS38.321 are as follows:

1) $C_i$: this field indicates the presence of a PH field for the Serving Cell with ServCellIndex i as specified in TS38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported.
2) R: this field indicates a reserved bit, set to 0.
3) V: this field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1 PH, Type 2 PH, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted.
4) Power Headroom (PH): this field indicates the power headroom level. The length of the field is 6 bits. The reported PH and the corresponding power headroom levels are shown in Table 6.1.3.8-1 in TS38.321 (the corresponding measured values in dB for the NR serving cell are specified in TS38.133 while the corresponding measured values in dB for the E-UTRA serving cell are specified in TS36.133 [12]).
5) P: if mpe-Reporting-FR2 is configured and the serving cell operates on FR2, the MAC entity shall set this field to 0 if the applied P-MPR value, to meet MPE requirements, as specified in TS38.101-2 [15], is less than P-MPR_00 as specified in TS38.133 and to 1 otherwise. If mpe-Reporting-FR2 is not configured or the serving cell operates on FR1, this field indicates whether power backoff is applied due to power management (as allowed by $P\text{-}MPR_c$ as specified in TS38.101-1 [14], TS38.101-2 [15], and TS38.101-3 [16]). The MAC entity shall set the P field to 1 if the corresponding $P_{CMAX,f,c}$ field would have had a different value if no power backoff due to power management had been applied.
6) $P_{CMAX,f,c}$: if present, this field indicates the $P_{CMAX,f,c}$ (as specified in TS38.213 [6]) for the NR serving cell and the $P_{CMAX,c}$ or $\tilde{P}_{CMAX,c}$ (as specified in TS36.213 [17]) for the E-UTRA serving cell used for calculation of the preceding PH field. The reported $P_{CMAX,f,c}$ and the corresponding nominal UE transmit power levels are shown in Table 6.1.3.8-2 in TS38.321 (the corresponding measured values in dBm for the NR serving cell are specified in TS38.133 while the corresponding measured values in dBm for the E-UTRA serving cell are specified in TS36.133 [12]).
7) MPE: If mpe-Reporting-FR2 is configured, and the serving cell operates on FR2, and if the P field is set to 1, this field indicates the applied power backoff to meet MPE requirements, as specified in TS38.101-2 [15]. This field indicates an index to Table 6.1.3.8-3 and the corresponding measured values of P-MPR levels in dB are specified in TS38.133 [11]. The length of the field is 2 bits. If mpe-Reporting-FR2 is not configured, or if the serving cell operates on FR1, or if the P field is set to 0, R bits are present instead.

Figure 4:
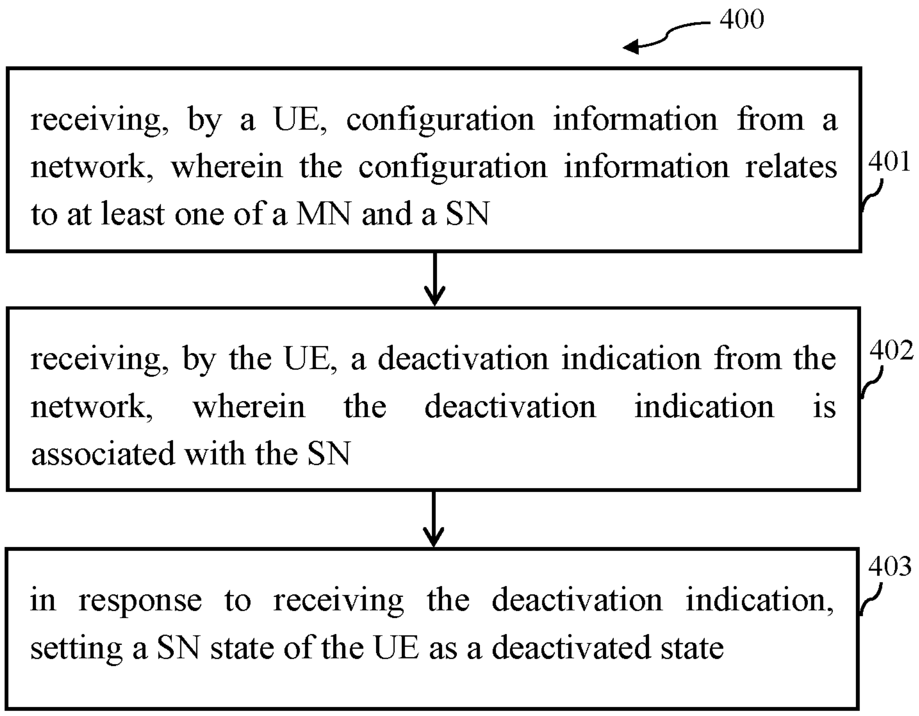
FIG. 4 illustrates a flow chart of a method for setting a SN state of a UE in accordance with some embodiments of the present application.

FIG. 4 illustrates a flow chart of a method for setting a SN state of a UE in accordance with some embodiments of the present application.

The exemplary method 400 in the embodiments of FIG. 4 may be performed by a UE, e.g., UE 101 as shown and illustrated in FIG. 1. Although described with respect to a UE, it should be understood that other device(s) may be configured to perform the method as shown and illustrated in FIG. 4. The embodiments of FIG. 4 assume that a MN and a SN in a MR-DC scenario in these embodiments may be combined in any one of EN-DC, NGEN-DC, NE-DC, and NR-DC scenarios.

In the exemplary method 400 as shown in FIG. 4, in operation 401, a UE receives configuration information from a network. The configuration information relates to at least one of a MN and a SN. In some embodiments, the UE receives the configuration information from the MN and/or the SN.

In operation 402, the UE receives a deactivation indication from the network. In some embodiments, the UE receives the deactivation indication from the MN and/or the SN. The deactivation indication is associated with the SN. The deactivation indication may also be named as a deactivation indication for deactivating a SN, a SN deactivation indication, or the like. The deactivation indication may be included in a RRC message and/or a deactivation MAC CE. For instance, the RRC message may be a RRCreconfiguration message as specified in 3GPP standard documents. A deactivation MAC CE may also be named as a MAC CE for deactivation, a dormancy MAC CE, a MAC CE for dormancy, a dormant MAC CE, or the like.

In operation 403, in response to receiving the deactivation indication, the UE sets a SN state of the UE as a deactivated state. A SN state of a UE may also be named as a SN state in a UE side, a SN in a UE side, a SN of a UE, or the like. A SN state of a UE which is set as a deactivated state may also be named as “a deactivated SN state in a UE side”, “a deactivated SN state of a UE”, “a deactivated SN in a UE side”, “a deactivated SN of a UE”, or the like. A SN state of a UE which is set as an activated state may also be named as “an activated SN state in a UE side”, “an activated SN state of a UE”, “an activated SN in a UE side”, “an activated SN of a UE”, or the like. Specific examples of the embodiments of FIG. 4 are described in Embodiments 1-3 and 5 as below.

According to some embodiments, if a timer for a beam failure detection (e.g., beamFailureDetectionTimer) is running when the UE receives the deactivation indication in operation 402, the UE may stop the timer for a beam failure detection.

According to some further embodiments, if a timer associated with a physical layer problem (e.g., timer T310) is running when the UE receives the deactivation indication in operation 402, the UE may stop the timer associated with a physical layer problem.

According to some other embodiments, if a timer for initiating failure recovery based on triggering a measurement report (e.g., timer T312) is running when the UE receives the deactivation indication in operation 402, the UE may stop the timer for initiating failure recovery based on triggering a measurement report.

According to some embodiments, upon the UE receiving the deactivation indication in operation 402, the UE may suspend any configured uplink grant type 1 associated with the SN and/or clear any configured downlink assignment and any configured uplink grant Type 2 associated with the SN.

According to some further embodiments, if a time alignment timer (TAT) expiries when the SN state of the UE is in the deactivated state, the UE may:

(1) stop a timer for a beam failure detection (e.g., beamFailureDetectionTimer), if this timer is running;

(2) stop a timer associated with a physical layer problem (e.g., timer T310), if this timer is running; and/or (3) stop a timer for initiating failure recovery based on triggering a measurement report (e.g., timer T312), if this timer is running.

According to some other embodiments, if the SN state of the UE is in the deactivated state, the UE may set an information element (IE), that is associated with a usage of a timer for initiating failure recovery based on triggering a measurement report (e.g., timer T312), as false. The IE may be configured in a RRC reconfiguration message. For example, the UE may set the IE “use T312” in a RRC reconfiguration message as “false” when the SN of the UE is deactivated.

According to some additional embodiments, if the SN state of the UE is in the deactivated state, the UE disables a timer for initiating failure recovery based on triggering a measurement report (e.g., timer T312). In an embodiment, the UE may further set the SN state of the UE as an activated state. If the UE sets the SN state of the UE as the activated state, the timer for initiating failure recovery based on triggering a measurement report is allowed to be started.

According to some other embodiments, if a timer for fast MCG link recovery (e.g., timer T316) is not running when the UE receives the deactivation indication in operation 402, the UE sets the SN state of the UE as the deactivated state.

According to some additional embodiments, if a timer for deactivating the SN state of the UE expires while a timer for fast MCG link recovery (e.g., timer T316) is not running, the UE sets the SN state of the UE as the deactivated state.

In some embodiments, in response to setting the SN state of the UE as the deactivated state, the UE transmits a power headroom report (PHR) to the network. The PHR may be transmitted to the network by a PHR MAC CE. The PHR MAC CE may use a multiple entry format (e.g., a multiple entry PHR MAC CE as illustrated in FIG. 3A) or a single entry format (e.g., a single entry PHR MAC CE as illustrated in FIG. 3B).

In some other embodiments, the UE further sets the SN state of the UE as an activated state; and in response to setting the SN state of the UE as the activated state, the UE transmits a PHR to the network. The PHR may be transmitted to the network by a PHR MAC CE. The PHR MAC CE may use a multiple entry format (e.g., a multiple entry PHR MAC CE as illustrated in FIG. 3A) or a single entry format (e.g., a single entry PHR MAC CE as illustrated in FIG. 3B).

In some embodiments, in response to setting the SN state of the UE as the deactivated state, the UE may consider an information element (IE) of PHR Type 2 for a cell of other MAC entity as “false”. For example, the UE may consider an IE “phr-Type 2OtherCell” as “false”, and the IE represents a presence of a PH field for a special cell (SpCell) of a MAC entity as specified in 3GPP standard documents.

Details described in all other embodiments of the present application (for example, details of an indication for deactivating a SN state of a UE) are applicable for the embodiments of FIG. 4. Moreover, details described in the embodiments of FIG. 4 are applicable for all the embodiments of FIGS. 1-3 and 5-7.

Figure 5:
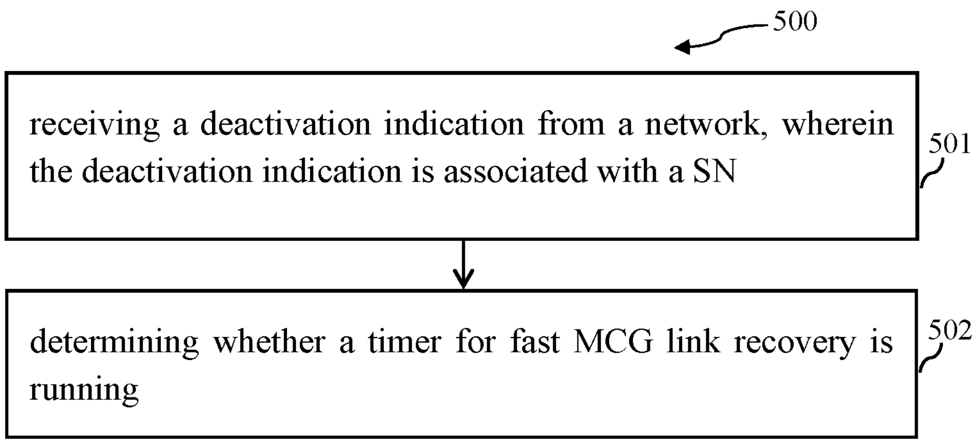
FIG. 5 illustrates a flow chart of a method for receiving an indication to deactivate a SN state of a UE in accordance with some embodiments of the present application.

FIG. 5 illustrates a flow chart of a method for receiving an indication to deactivate a SN state of a UE in accordance with some embodiments of the present application.

The exemplary method 500 in the embodiments of FIG. 5 may be performed by a UE, e.g., UE 101 as shown and illustrated in FIG. 1. Although described with respect to a UE, it should be understood that other device(s) may be configured to perform the method as shown and illustrated in FIG. 5. The embodiments of FIG. 5 assume that a MN and a SN in a MR-DC scenario in these embodiments may be combined in any one of EN-DC, NGEN-DC, NE-DC, and NR-DC scenarios.

In the exemplary method 500 as shown in FIG. 5, in operation 501, a UE receives a deactivation indication from a network. The deactivation indication is associated with a SN. In some embodiments, the UE receives the deactivation indication from the MN and/or the SN.

In operation 502, the UE determines whether a timer for fast MCG link recovery is running. A specific example of the embodiments of FIG. 5 is described in Embodiment 4 as below.

According to some embodiments, if the timer for fast MCG link recovery is running when the deactivation indication is received, the UE may ignore the deactivation indication.

According to some other embodiments, in response to initiating a fast MCG link recovery procedure, the UE may stop a timer for deactivating a SN state of the UE.

Details described in all other embodiments of the present application (for example, details of an indication for deactivating a SN state of a UE) are applicable for the embodiments of FIG. 5. Moreover, details described in the embodiments of FIG. 5 are applicable for all the embodiments of FIGS. 1-4, 6, and 7.

Figure 6:
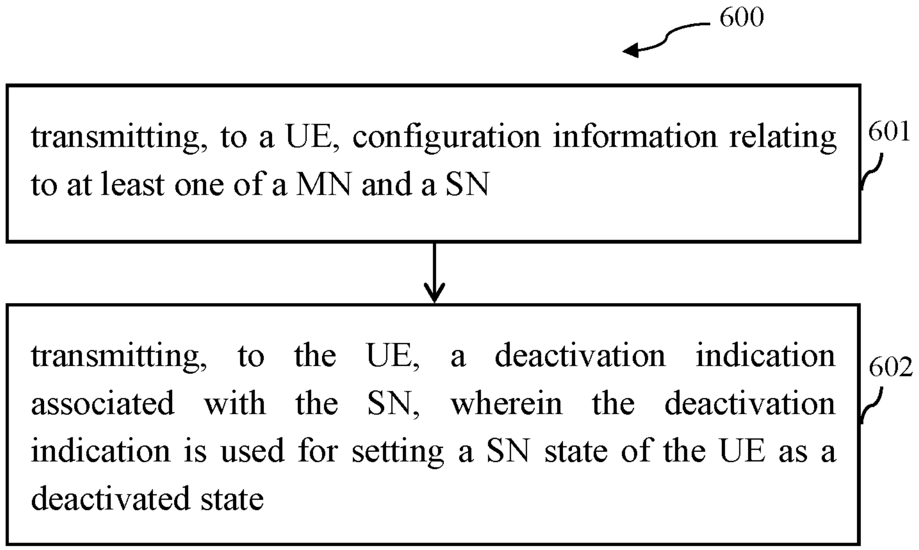
FIG. 6 illustrates a flow chart of a method for transmitting an indication to deactivate a SN state of a UE in accordance with some embodiments of the present application.

FIG. 6 illustrates a flow chart of a method for transmitting an indication to deactivate a SN state of a UE in accordance with some embodiments of the present application.

The exemplary method 600 in the embodiments of FIG. 6 may be performed by a BS, e.g., a MN or a SN in a MR-DC scenario. Although described with respect to a BS, it should be understood that other device(s) may be configured to perform the method as shown and illustrated in FIG. 6. The embodiments of FIG. 6 assume that a MN and a SN in a MR-DC scenario in these embodiments may be combined in any one of EN-DC, NGEN-DC, NE-DC, and NR-DC scenarios.

In the exemplary method 600 as shown in FIG. 6, in operation 601, a BS (e.g., MN 102 or SN 103 as shown and illustrated in FIG. 1) transmits configuration information, which relates to at least one of a MN and a SN, to a UE (e.g., UE 101 as shown and illustrated in FIG. 1). In some embodiments, the MN and/or the SN transmit the deactivation indication to the UE.

In operation 602, the BS transmits a deactivation indication, which is associated with the SN, to the UE. The deactivation indication is used for setting a SN state of the UE as a deactivated state.

According to some embodiments, the BS transmits configuration information, which relates to a format of a PHR MAC CE, to the UE. For example, the BS transmits RRC signalling including this configuration information to the UE. The format of a PHR MAC CE may be a multiple entry format (e.g., a multiple entry PHR MAC CE as illustrated in FIG. 3A) or a single entry format (e.g., a single entry PHR MAC CE as illustrated in FIG. 3B).

According to some other embodiments, the BS further transmits, to the UE, configuration information relating to an IE of PHR Type 2 for a cell of other MAC entity, e.g., an IE "phr-Type2OtherCell". For example, the BS transmits RRC signalling including this configuration information to the UE. In one embodiment, the configuration information may indicate that the IE of PHR Type 2 for the cell of other MAC entity (e.g., "phr-Type2OtherCell") is set as false.

According to some additional embodiments, the BS may transmit one single RRC message, which includes the deactivation indication, the configuration information relating to a format of a PHR MAC CE, and/or the configuration information relating to an IE of PHR Type 2 for a cell of other MAC entity. A specific example of the embodiments of FIG. 6 is described in Embodiment 5 as below.

Details described in all other embodiments of the present application (for example, details of an indication for deactivating a SN state of a UE) are applicable for the embodiments of FIG. 6. Moreover, details described in the embodiments of FIG. 6 are applicable for all the embodiments of FIGS. 1-5 and 7.

The following texts describe specific Embodiments 1-5 of the methods as shown and illustrated in FIGS. 4-6. According to Embodiments 1-5, a UE and a BS (e.g., a MN or a SN) may perform following operations. The UE may be UE 101 as shown and illustrated in FIG. 1. The MN may be MN 102 as shown and illustrated in FIG. 1. The SN may be SN 103 as shown and illustrated in FIG. 1.

Embodiment 1: this embodiment handles a case that a RLM or a BFD procedure is not performed when a SN state of a UE (i.e., a SN state in the UE side) is a deactivated state.

(1) Step 1: A UE accesses a BS. A MN and a SN are configured to the UE.

Timer T312 may be configured to the UE.

(2) Step 2: The UE receives an indication to deactivate SN (i.e., a deactivation indication associated with the SN) from a network.

For example, the deactivation indication may be received from the MN or the SN. The deactivation indication could be included in a RRC message or a MAC CE.

(3) Step 3: Upon receiving the deactivation indication, a SN state of the UE is set as deactivated. In addition, the UE may:

a) Stop a timer for a beam failure detection, e.g., beamFailureDetectionTimer;

b) Stop timer T310 if timer T310 is running;

c) Stop timer T312 if timer T312 is running;

d) Suspend any configured uplink grant Type 1 and any configured uplink grant Type 2; and/or e) Clearing any configured downlink assignment and any configured uplink grant Type 2 associated with the SN.

Embodiment 2: this embodiment handles a case that a RLM or a BFD procedure is performed when a SN state of a UE (i.e., a SN state in the UE side) is in a deactivated state.

(1) Step 1: A UE accesses a BS. A MN and a SN are configured to the UE. Timer T312 may be configured to the UE.

(2) Step 2: The UE receives "a deactivation indication associated with the SN" from a network.

For example, the deactivation indication may be received from the MN or the SN. The deactivation indication could be included in a RRC message or a MAC CE.

(3) Step 3: Upon receiving the deactivation indication, a SN state of the UE is set as deactivated. In addition, upon an expiry of a time alignment timer (TAT), the UE may:

a) Stop a timer for a beam failure detection, e.g., beamFailure Detection Timer;

b) Stop timer T310 if timer T310 is running; and/or c) Stop timer T312 if timer T312 is running.

Embodiment 3: this embodiment handles a case that a RLM procedure is performed when a SN state of a UE (i.e., a SN state in the UE side) is in a deactivated state.

(1) Step 1: A UE accesses a BS. A MN and a SN are configured to the UE.

Timer T312 may be configured to the UE.

(2) Step 2: The UE may receive "a deactivation indication associated with the SN" from a network (e.g., the MN or the SN).

The deactivation indication received from the MN or the SN could be included in a RRC message or a MAC CE.

(3) Step 3: Upon receiving the deactivation indication, a SN state of the UE is set as deactivated.

(4) Step 4: The UE may adopt following Case A-1 or Case A-2 according to different scenarios or implementations.

1. Case A-1: The UE sets an IE "use T312" as FALSE when the SN state of the UE is set as deactivated.
2. Case A-2: If the IE "use T312" is still set as TRUE, upon triggering a measurement report for a measurement identity for which timer T312 has been configured, while timer T310 in PSCell is running, the UE may disable timer T312 if the SN state of the UE is set as deactivated.
   a) In some cases, the UE further sets the SN state of the UE as an activated state. When the SN state of the UE is set as activated, timer T312 is allowed to be started.

Embodiment 4: this embodiment handles a timer for deactivating a SN state of a UE (this timer may be named as "a timer for deactivated SN") when a UE is performing a fast MCG link recovery procedure.

(1) Step 1: A UE accesses a BS. A MN and a SN are configured to the UE.
   Timer T316 for fast MCG link recovery may be configured to the UE.

(2) Step 2: The UE may declare a RLF on a MCG. The UE initiates a fast MCG link recovery procedure (e.g., starting timer T316). In addition, the UE may adopt following Case B-1 or Case B-2 according to different scenarios or implementations.
   1. Case B-1: The UE stops a timer for deactivated SN when the UE initiates the fast MCG link recovery procedure.
   2. Case B-2: If the timer for deactivated SN expires while timer T316 is not running, a SN state of the UE enters a deactivated state.

(3) Step 3: If the UE receives, from the SN, a MAC CE to deactivate SN when T316 is running, the UE may ignore the MAC CE to deactivate SN and keep a SN state of the UE as activated. The MAC CE to deactivate SN represents an MAC CE including a deactivation indication associated with the SN.

(4) Step 4: The UE transmits a MCGfailureinformation message to the SN via the MN. For example, the MCGfailureinformation message may include an IE "failure Type" to set a MCG failure type. The IE "failure Type" may be set as 1310-Expiry, randomAccessProblem, or rlc-MaxNumRetx according to different cases.

(5) Step 5: The UE may receive a response, e.g., a handover command, from the MN via the SN.

Embodiment 5: this embodiment handles a PHR when a SN state of the UE is a deactivated state and provides two trigger conditions to transmit a PHR.

(1) Step 1: A UE accesses a BS. A MN and a SN are configured to the UE.

(2) Step 2: The UE receives a deactivation indication associated with the SN from a network, e.g., the MN or the SN.
   a) The deactivation indication from the MN or the SN could be included in a RRC message or a MAC CE.
   b) Upon receiving the deactivation indication, a SN state in the UE side is set as a deactivated state.
   c) Trigger condition: a PHR may be triggered upon setting the SN state in the UE side as a deactivated state.

(3) Step 3: The UE may adopt following Case C-1 or Case C-2 according to different scenarios or implementations.
   1. Case C-1: Upon setting the SN state in the UE side as a deactivated state, the UE may:
      a) Use multiple Entry PHR format or single entry PHR format for the PHR; and/or
      b) Consider an IE "phr-Type2OtherCell" as FALSE.
   2. Case C-2: The above configurations in Case C-1 can also be configured by the MN or the SN via RRC signalling.
      a) The MN or the SN may transmit one single RRC message, which includes the above configurations together with the deactivation indication, to the UE.

(4) Step 4: The UE receives, from the network (e.g., the MN or the SN), an indication to activate the SN state of the UE.
   a) Upon setting the SN state of the UE as an activated state, a PHR may be triggered.

Figure 7:
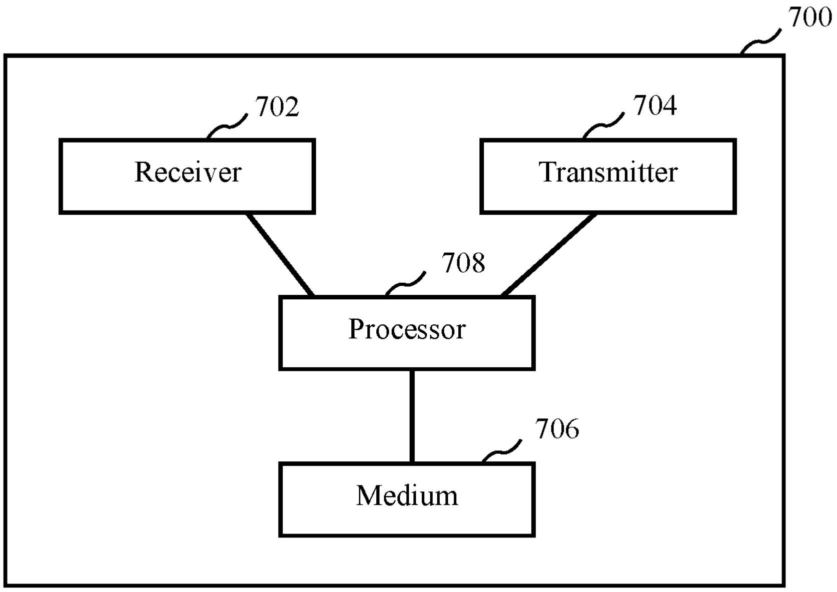
FIG. 7 illustrates an exemplary block diagram of an apparatus in accordance with some embodiments of the present application.

FIG. 7 illustrates an exemplary block diagram of an apparatus in accordance with some embodiments of the present application. In some embodiments of the present application, the apparatus 700 may be a UE or a BS, which can at least perform any of the methods illustrated in FIGS. 4-6.

As shown in FIG. 7, the apparatus 700 may include at least one receiver 702, at least one transmitter 704, at least one non-transitory computer-readable medium 706, and at least one processor 708 coupled to the at least one receiver 702, the at least one transmitter 704, and the at least one non-transitory computer-readable medium 706.

Although in FIG. 7, elements such as the at least one receiver 702, the at least one transmitter 704, the at least one non-transitory computer-readable medium 706, and the at least one processor 708 are described in the singular, the plural is contemplated unless limitation to the singular is explicitly stated. In some embodiments of the present application, the at least one receiver 702 and the at least one transmitter 704 are combined into a single device, such as a transceiver. In certain embodiments of the present application, the apparatus 700 may further include an input device, a memory, and/or other components.

In some embodiments of the present application, the at least one non-transitory computer-readable medium 706 may have stored thereon computer-executable instructions which are programmed to implement the operations of a method, for example as described in view of any of FIGS. 4-6, with the at least one receiver 702, the at least one transmitter 704, and the at least one processor 708.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A user equipment (UE) for wireless communication, comprising:
- at least one memory; and
- at least one processor coupled with the at least one processor and configured to cause the UE to:
  - receive configuration information from a network, wherein the configuration information relates to at least one of a master node (MN) and a secondary node (SN);
  - receive a deactivation indication from the network, wherein the deactivation indication is associated with the SN;
  - in response to receiving the deactivation indication, set an SN state of the UE as a deactivated state;
  - in response to setting the SN state of the UE as the deactivated state, transmit a first power headroom report (PHR) to the network;
  - set the SN state of the UE as an activated state; and
  - in response to setting the SN state of the UE as the activated state, transmit a second PHR to the network.

2. The UE of claim 1, wherein the at least one processor is further configured to cause the UE to:
- in response to a timer for a beam failure detection running when the deactivation indication is received, stop the timer for a beam failure detection;
- in response to a timer associated with a physical layer problem running when the deactivation indication is received, stop the timer associated with a physical layer problem;
- in response to a timer for initiating failure recovery based on triggering a measurement report running when the deactivation indication is received, stop the timer for initiating failure recovery based on triggering a measurement report;
- suspend configured uplink grant Type 1 associated with the SN; or
- clear a configured downlink assignment and configured uplink grant Type 2 associated with the SN.

3. The UE of claim 1, wherein the at least one processor is further configured to cause the UE to:
- in response to the SN state of the UE being in the deactivated state and in response to an expiry of a time alignment timer (TAT), perform at least one of:
  - in response to a timer for a beam failure detection running when the deactivation indication is received, stop the timer for a beam failure detection;
  - in response to a timer associated with a physical layer problem running, stop the timer associated with a physical layer problem; and
  - in response to a timer for initiating failure recovery based on triggering a measurement report running, stop the timer for initiating failure recovery based on triggering a measurement report.

4. The UE of claim 1, wherein the at least one processor is further configured to cause the UE to:
- in response to the SN state of the UE being in the deactivated state, set an information element (IE) associated with a usage of a timer for initiating failure recovery based on triggering a measurement report as false, wherein the IE is configured in a radio resource control (RRC) reconfiguration message.

5. The UE of claim 1, wherein the at least one processor is further configured to cause the UE to:
- in response to the SN state of the UE being in the deactivated state, disable a timer for initiating failure recovery based on triggering a measurement report.

6. The UE of claim 5, wherein the at least one processor is further configured to cause the UE to:
- in response to setting the SN state of the UE as the activated state, allow the timer for initiating failure recovery based on triggering a measurement report to be started.

7. The UE of claim 1, wherein the at least one processor is further configured to cause the UE to:
- in response to a timer for fast master cell group (MCG) link recovery not running when the deactivation indication is received, set the SN state of the UE as the deactivated state.

8. The UE of claim 1, wherein the at least one processor is further configured to cause the UE to:
- in response to an expiry of a timer for deactivating the SN state of the UE and in response to a timer for fast master cell group (MCG link) recovery not running, set the SN state of the UE as the deactivated state.

9. The UE of claim 1, wherein the at least one processor is further configured to cause the UE to:
- transmit a first power headroom report (PHR) to the network.

10. The UE of claim 1, wherein the at least one processor is further configured to cause the UE to:
- in response to setting the SN state of the UE as the deactivated state, consider an information element (IE) of PHR Type 2 for a cell of another medium access control (MAC) entity as false.

11. A processor for wireless communication, comprising:
- at least one controller coupled with at least one memory and configured to cause the processor to:
  - receive configuration information from a network, wherein the configuration information relates to at least one of a master node (MN) and a secondary node (SN);
  - receive a deactivation indication from the network, wherein the deactivation indication is associated with the SN;
  - in response to receiving the deactivation indication, set an SN state of the processor as a deactivated state;
  - in response to setting the SN state of the UE as the deactivated state, transmit a first power headroom report (PHR) to the network;
  - set the SN state of the UE as an activated state; and
  - in response to setting the SN state of the UE as the activated state, transmit a second PHR to the network.

12. The processor of claim 11, wherein the at least one controller is further configured to cause the processor to:

in response to a timer for a beam failure detection running when the deactivation indication is received, stop the timer for a beam failure detection;

in response to a timer associated with a physical layer problem running when the deactivation indication is received, stop the timer associated with a physical layer problem;

in response to a timer for initiating failure recovery based on triggering a measurement report running when the deactivation indication is received, stop the timer for initiating failure recovery based on triggering a measurement report;

suspend configured uplink grant Type 1 associated with the SN; or clear a configured downlink assignment and configured uplink grant Type 2 associated with the SN.

13. The processor of claim 11, wherein the at least one controller is further configured to cause the processor to:

in response to the SN state of the UE being in the deactivated state and in response to an expiry of a time alignment timer (TAT), perform at least one of:

in response to a timer for a beam failure detection running when the deactivation indication is received, stop the timer for a beam failure detection;

in response to a timer associated with a physical layer problem running, stop the timer associated with a physical layer problem; and in response to a timer for initiating failure recovery based on triggering a measurement report running, stop the timer for initiating failure recovery based on triggering a measurement report.

14. The processor of claim 11, wherein the at least one controller is further configured to cause the processor to:

in response to the SN state of the UE being in the deactivated state, set an information element (IE) associated with a usage of a timer for initiating failure recovery based on triggering a measurement report as false, wherein the IE is configured in a radio resource control (RRC) reconfiguration message.

15. A method performed by a user equipment (UE), the method comprising:

receiving configuration information from a network, wherein the configuration information relates to at least one of a master node (MN) and a secondary node (SN);

receiving a deactivation indication from the network, wherein the deactivation indication is associated with the SN;

in response to receiving the deactivation indication, setting an SN state of the UE as a deactivated state;

in response to setting the SN state of the UE as the deactivated state, transmitting a first power headroom report (PHR) to the network;

setting the SN state of the UE as an activated state; and in response to setting the SN state of the UE as the activated state, transmitting a second PHR to the network.

16. The method of claim 15, further comprising:

in response to a timer for a beam failure detection running when the deactivation indication is received, stopping the timer for a beam failure detection;

in response to a timer associated with a physical layer problem running when the deactivation indication is received, stopping the timer associated with a physical layer problem;

in response to a timer for initiating failure recovery based on triggering a measurement report running when the deactivation indication is received, stopping the timer for initiating failure recovery based on triggering a measurement report;

suspending configured uplink grant Type 1 associated with the SN; or clearing a configured downlink assignment and configured uplink grant Type 2 associated with the SN.

17. The method of claim 15, further comprising:

in response to the SN state of the UE being in the deactivated state and in response to an expiry of a time alignment timer (TAT), performing at least one of:

in response to a timer for a beam failure detection running when the deactivation indication is received, stopping the timer for a beam failure detection;

in response to a timer associated with a physical layer problem running, stopping the timer associated with a physical layer problem; and in response to a timer for initiating failure recovery based on triggering a measurement report running, stopping the timer for initiating failure recovery based on triggering a measurement report.

18. The method of claim 15, further comprising:

in response to the SN state of the UE being in the deactivated state, setting an information element (IE) associated with a usage of a timer for initiating failure recovery based on triggering a measurement report as false, wherein the IE is configured in a radio resource control (RRC) reconfiguration message.

19. The method of claim 15, further comprising:

in response to the SN state of the UE being in the deactivated state, disabling a timer for initiating failure recovery based on triggering a measurement report.

20. The method of claim 15, further comprising:

in response to a timer for fast master cell group (MCG) link recovery not running when the deactivation indication is received, setting the SN state of the UE as the deactivated state.

* * * * *